(12) United States Patent
Martinelli (10) Patent No.: US 8,773,071 B2
(45) Date of Patent: Jul. 8, 2014

(54) SYSTEM AND METHOD FOR CELL VOLTAGE BALANCING

(75) Inventor: Robert Matthew Martinelli, Murrieta, CA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 12/917,471

(22) Filed: Nov. 1, 2010

(65) Prior Publication Data

US 2012/0105004 A1      May 3, 2012

(51) Int. Cl.
*H01M 10/44*      (2006.01)
*H01M 10/46*      (2006.01)

(52) U.S. Cl.
USPC ......................................................... 320/119

(58) Field of Classification Search
USPC .......................................... 320/116, 118, 119
See application file for complete search history.

(56) References Cited

U.S. PATENT DOCUMENTS

| | | |
|---|---|---|
| 6,873,134 B2 | 3/2005 | Canter et al. |
| 2005/0017682 A1 | 1/2005 | Canter et al. |
| 2008/0088277 A1 | 4/2008 | Wang et al. |
| 2009/0015206 A1 | 1/2009 | Seman, Jr. et al. |
| 2009/0267566 A1* | 10/2009 | Yano .............................. 320/118 |
| 2009/0278496 A1 | 11/2009 | Nakao et al. |

FOREIGN PATENT DOCUMENTS

| | | |
|---|---|---|
| DE | EP2385605 A2 | 11/2011 |
| JP | EP1670113 A2 | 6/2006 |
| KR | EP1912307 A2 | 4/2008 |
| WO | WO9500978 A1 | 1/1995 |

OTHER PUBLICATIONS

Extended European Search Report mailed on Mar. 5, 2012.

* cited by examiner

*Primary Examiner* — Edward Tso
(74) *Attorney, Agent, or Firm* — Ameh IP; Elahe Toosi; Lowell Campbell (57) ABSTRACT

A method for cell voltage balancing is disclosed. A plurality of cells is coupled to a plurality of cell interface circuits, and the cell interface circuits are driven with a balancing transformer such that a balancing current flows between the cell interface circuits. Control gates of the cell interface circuits are driven with a gate drive transformer such that two adjacent circuits of the cell interface circuits are activated with opposite phase.

20 Claims, 5 Drawing Sheets

SYSTEM AND METHOD FOR CELL VOLTAGE BALANCING

FIELD

Embodiments of the present disclosure relate generally to battery cell control circuits. More particularly, embodiments of the present disclosure relate to battery cell voltage balancing.

BACKGROUND

Lithium ion batteries that operate at voltages higher than a single cell can provide are generally comprised of multiple cells connected in series. Lithium ion battery cells may function non-optimally when subjected to an over-voltage or under-voltage condition due to overcharging or undercharging. Over a life of a battery, a battery cell may develop an internal leakage resistance mismatched higher or lower relative to other battery cells. Current through the battery, may cause one or more battery cells to become overcharged or undercharged due to over-voltage or under-voltage across the internal resistance.

SUMMARY

A method for cell voltage balancing is disclosed. A plurality of cells is coupled to a plurality of interface circuits, and the interface circuits are driven with a balancing transformer such that a balancing current flows between the interface circuits. Control gates of the interface circuits are driven with a gate drive transformer such that two adjacent circuits of the interface circuits are activated with opposite phase.

In a first embodiment, a cell voltage balancing converter system is operable to couple to a series of cells and comprises a group of cell interface circuits, and a balancing transformer. The group of cell interface circuits comprises a first cell interface circuit, an even number of inner cell interface circuits, and a last cell interface circuit. The first cell interface circuit is operable to couple to a first cell in the series of cells, and comprises a first balancing bus port operable to couple to a first balancing bus. The even number of inner cell interface circuits is operable to couple to the even number of cells in the series of cells. A last cell interface circuit comprising a last interface to a last cell in the series of cells, and comprising a second balancing bus port operable to couple to a second balancing bus. The balancing transformer is coupled to a third balancing bus port and a fourth balancing bus port, and is operable to balance voltage across the series of cells.

In a second embodiment, a cell voltage balancing converter system comprises a plurality of cell voltage balancing converter modules each operable to control an even number of cells. The system further comprises at least one balancing bus coupled between at least two of the cell voltage balancing converter modules.

In a third embodiment, a method for cell voltage balancing comprises coupling a plurality of cells to a plurality of interface circuits, and driving the interface circuits with a balancing transformer such that a balancing current flows between the interface circuits. The method further comprises driving control gates of the interface circuits with a gate drive transformer such that two adjacent circuits of the interface circuits are activated with opposite phase.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to, amplifiers, sample and hold circuits, telemetry, battery cell voltage measurement, and other functional aspects of the systems (and the individual operating components of the systems) may not be described in detail herein. In addition, those skilled in the art will appreciate that embodiments of the present disclosure may be practiced in conjunction with a variety of circuits, and that the embodiments described herein are merely example embodiments of the disclosure.

Embodiments of the disclosure are described herein in the context of a practical non-limiting application, namely, lithium-ion battery cell voltage measurement. Embodiments of the disclosure, however, are not limited to such lithium-ion battery, and the techniques described herein may also be utilized in other applications. For example but without limitation, embodiments may be applicable to lithium-ion battery cells, lithium-polymer battery cells, lithium-sulfur battery cells, fuel cells, other battery types, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
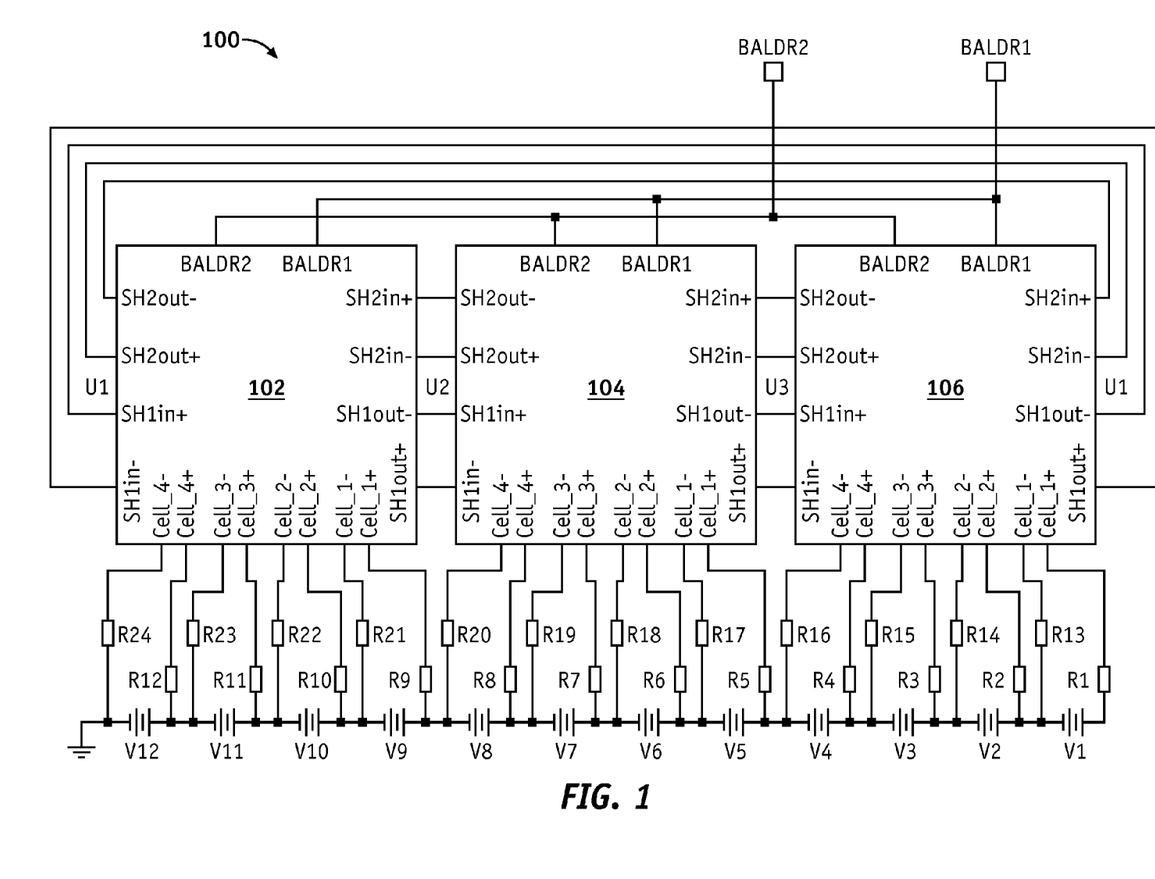
FIG. 1 is an illustration of a circuit diagram of an exemplary cell voltage balancing converter system according to an embodiment of the disclosure.

FIG. 1 is an illustration of a circuit diagram of an exemplary cell voltage balancing converter system 100 according to an embodiment of the disclosure. The cell voltage balancing converter system 100 comprises cell voltage balancing converter modules 102/104/106 coupled to a series of battery cells V1-V12. The cell voltage balancing converter module 102 balances a voltage across each of the battery cells V9-V12 to match a first common voltage. The cell voltage balancing converter module 104 balances a voltage across each of the battery cells V5-V8 to match a second common voltage. The cell interface circuit 106 balances a voltage across each of the battery cells V1-V4 to match a third common voltage. A balancing bus U1 provides a balancing current between the cell voltage balancing converter module 102 and the cell voltage balancing converter module 106 such that the first common voltage and the third common voltage become substantially the same. A balancing bus U2 provides a balancing current between the cell voltage balancing converter module 104 and the cell voltage balancing converter module 106 such that the second common voltage and the third common voltage become substantially the same. A balancing bus U3 provides a balancing current between the cell voltage balancing converter module 102 and the cell voltage balancing converter module 104 such that the first common voltage and the second common voltage become substantially the same. A bi-phase clock signal comprising a first phase BALDR1 and a second phase BALDR2 is operable to activate circuits V1, V3, ..., V11 (first subset) according to the first phase BALDR1, and to activate circuits V2, V4, ..., V12 (second subset) according to the second phase BALDR2.

Figure 2:
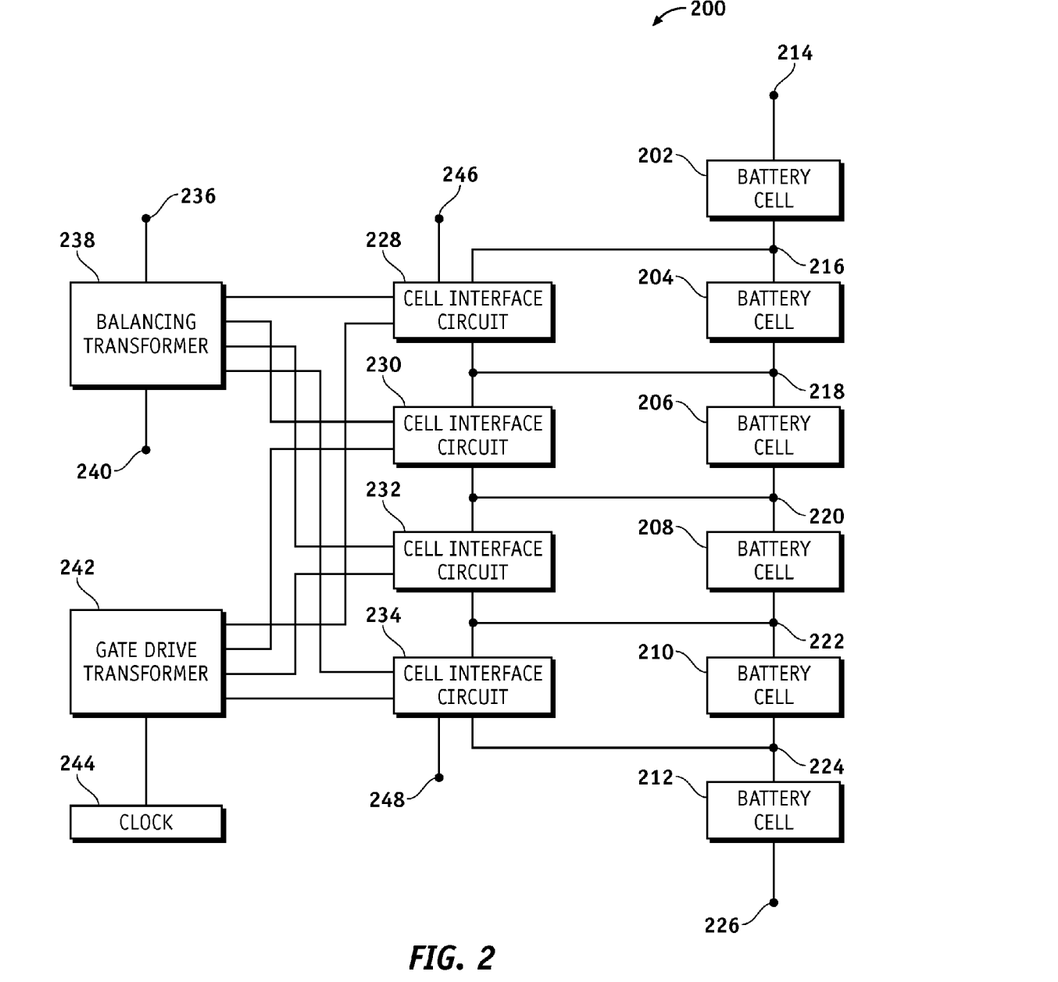
FIG. 2 is an illustration of a functional block diagram of an exemplary cell voltage balancing converter system according to an embodiment of the disclosure.

FIG. 2 is an illustration of a functional block diagram of an exemplary cell voltage balancing converter system 200 according to an embodiment of the disclosure. The cell voltage balancing converter system 200 comprises a group of battery cell interface circuits 228-234, a balancing transformer 238, and a gate drive transformer 242.

The group of battery cell interface circuits 228-234 comprises a first cell interface circuit 228, an even number (i.e., an even number can be zero) of inner cell interface circuits 230/232, and a last cell interface circuit 234. The first cell interface circuit 228 is operable to couple to a first cell 204 in a series of battery cells such as battery cells 204-210, which are a subseries of V1-V12 (e.g., V1-V4, or V5-V8 in FIG. 1). The first cell interface circuit 228 comprises a first balancing bus port 246 operable to couple to a first balancing bus (e.g., U1 in FIG. 1). The even number (e.g., 2) of inner cell interface circuits 230/232 is operable to couple to the even number of battery cells 206/208 in the series of battery cells 204-210. A last cell interface circuit 234 comprises a last interface to a last battery cell 210 in the series of battery cells 204-210, and comprises a second balancing bus port 248 operable to couple to a second balancing bus (e.g., U2 in FIG. 1).

The balancing transformer 238 is coupled to a third balancing bus port 236 and a fourth balancing bus port 240, which may be coupled to balancing buses such as U2 and U3 respectively. The balancing transformer 238 is operable to balance voltage across each of the series of battery cells 204-210 by inductively flowing a balancing current between each of the group of battery cell interface circuits 228-234 such that a voltage across each of the series of cells 204-210 is substantially the same. Balancing between even cells (e.g., V2, V4, V6, V8, V10, V12) (second subset) is accomplished by action of the balancing transformer 238, where an instantaneous voltage is substantially the same on all windings of the balancing transformer 238, and therefore current flows from high voltage cells to low voltage cells. Balancing between the even cells (e.g., V2, V4, V6, V8, V10, V12) (second subset) and odd cells (e.g., V1, V3, V5, V7, V9, V11) (first subset) occurs because an average voltage across the balancing transformer 238 will be substantially the same during a $1^{st}$ half of a clock cycle of a clock 244 as a $2^{nd}$ half of the clock cycle. Therefore, a magnetizing current of the balancing transformer 238 will increase to remove charge from the higher voltage cell group while charging the lower voltage cell group.

The clock 244 may comprise, for example but without limitation, a bi-phase clock, and the like. A bi-phase clock is a clock whose signal is active in two different signal phases. For example, a single phase clock signal may be used as a bi-phase clock by using both rising and falling edges of a clock signal by, for example but without limitation, coupling the clock signal to complimentary gates in a CMOS circuit, coupling the single phase clock to a transformer and using alternate polarity connections, and the like. The clock 244 may comprise, for example but without limitation, a single phase clock and bi-phase functionality may be derived via coupled connections to the gate drive transformer 242 as described below.

The gate drive transformer 242 is coupled to the cell interface circuits 228-234, and is operable to receive a clock drive signal from the clock 244. The gate drive transformer 242 drives a first half 228/232 of the cell interface circuits 228-234 at a first phase of the clock drive signal and drive a second half 230/234 of the cell interface circuits 228-234 at a second phase of the clock drive signal. By alternating activation of the first half 228/232 and the second half 230/234, an adequate balancing current is allowed to flow without dissipating a substantial amount of energy from the battery cells 204-210.

Figure 3:
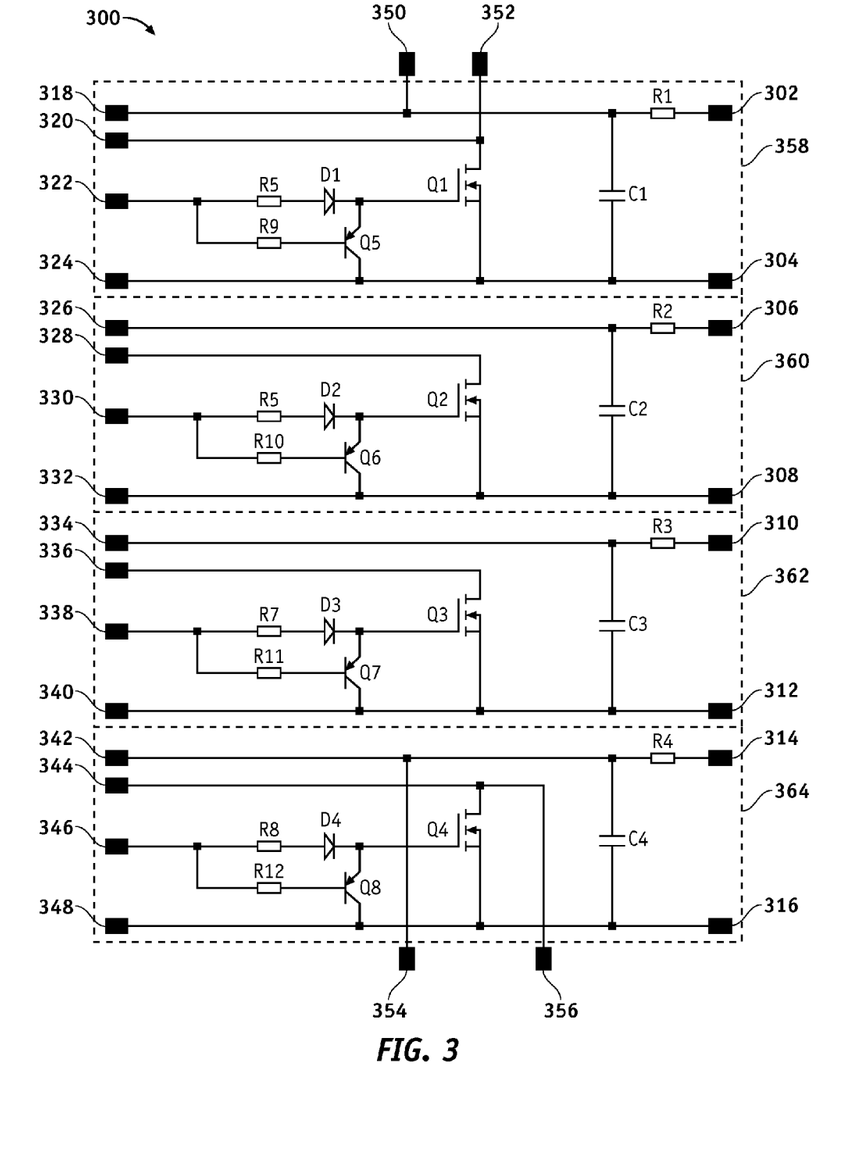
FIG. 3 is an illustration of a circuit diagram of an exemplary group of cell interface circuits according to an embodiment of the disclosure.

FIG. 3 is an illustration of an exemplary group of cell interface circuits 300 according to an embodiment of the disclosure. The group of cell interface circuits 300 comprises the battery cell interface circuits 358-364 (228-234 in FIG. 2).

The first cell interface circuit 358 (228 in FIG. 2) comprises a capacitor C1 operable to hold a voltage across the leads 302 (216 in FIG. 2) and 304 (218 in FIG. 2). A field effect transistor (FET) Q1 is driven by a clock signal from the leads 322 and 324 via a drive circuit comprising FET Q5, Diode D1, and resistors R5 and R9. When activated by the leads 322 and 324, the FET Q1 allows current to flow between the lead 302 and the lead 304 through the balancing transformer 238. The charge on the capacitor C1 may be balanced with other modules through the balancing bus ports 350/352.

The even number (i.e., an even number can be zero) of inner cell interface circuits 360/362 (230/232 in FIG. 2) comprise a capacitor C2/C3 operable to hold a voltage across the leads 306/310 (218/220 in FIG. 2) and 308/312 (220/222 in FIG. 2). A FET Q2/Q3 is driven by a clock signal from the leads 330/338 and 332/340 via a drive circuit comprising FET Q6/Q7, Diode D2/D3, and resistors R6/R7 and R10/R11. When activated by the leads 330/338 and 332/340, the FET Q2/Q3 allows current to flow between the lead 306/310 and the lead 308/312 through the balancing transformer 238.

The last cell interface circuit 364 (234 in FIG. 2) comprises a capacitor C4 operable to hold a voltage across the leads 314 (222 in FIG. 2) and 316 (224 in FIG. 2). A field effect transistor (FET) Q4 is drive by a clock signal from the leads 346 and 348 via a drive circuit comprising FET Q8, Diode D4, and resistors R8 and R12. When activated by the leads 346 and 348, the FET Q4 allows current to flow between the lead 314 and the lead 316 through the balancing transformer 238. The charge on the capacitor C4 may be balanced through the balancing bus ports 354/356.

Figure 4:
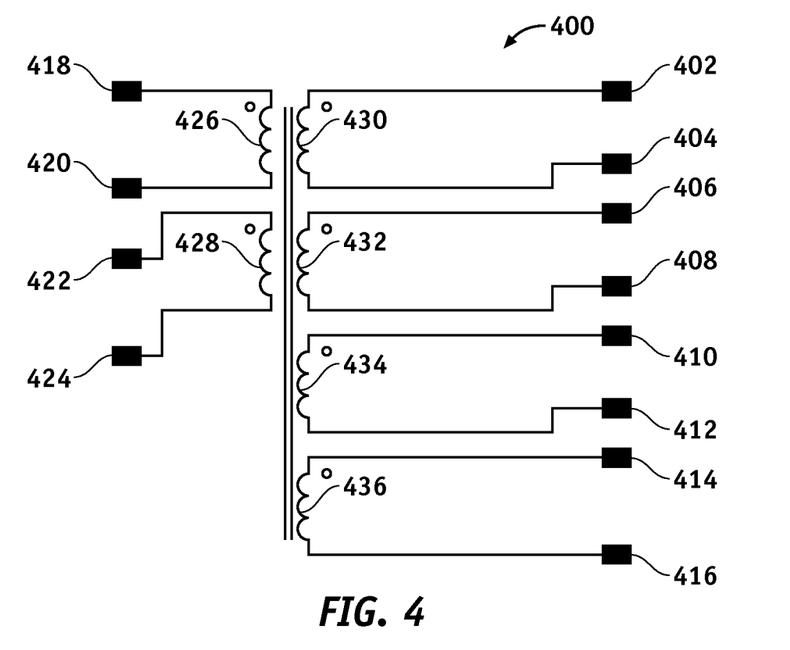
FIG. 4 is an illustration of a circuit diagram of an exemplary balancing transformer according to an embodiment of the disclosure.

FIG. 4 is an illustration of a circuit diagram of an exemplary balancing transformer 400 according to an embodiment of the disclosure. The balancing transformer 400 comprises a first primary winding 426 coupled to a first balancing bus port 418/420 operable to couple to a balancing bus such as U2. The balancing transformer 400 also comprises a second primary winding 428 coupled to a second balancing bus port 422/424 operable to couple to a balancing bus such as U3. The balancing transformer 400 also comprises a first secondary winding 430 comprising leads 402/404 coupled to a battery cell interface circuit 358 (228 in FIG. 2) at leads 318/320. The balancing transformer 400 also comprises a second secondary winding 432 comprising leads 406/408 coupled to a battery cell interface circuit 230 at leads 328/326. The balancing transformer 400 also comprises a third secondary winding 434 comprising leads 410/412 coupled to a battery cell interface circuit 232 at leads 334/336. The balancing transformer 400 also comprises a fourth secondary winding 436 comprising leads 414/416 coupled to a battery cell interface circuit 234 at leads 344/342. The balancing transformer 238/400 is operable to balance voltage across each of the series of battery cells 204-210 by inductively flowing a balancing current between each of the group of battery cell interface circuits 358-364 (228-234 in FIG. 2) such that a voltage across each of the series of cells 204-210 is substantially the same.

Figure 5:
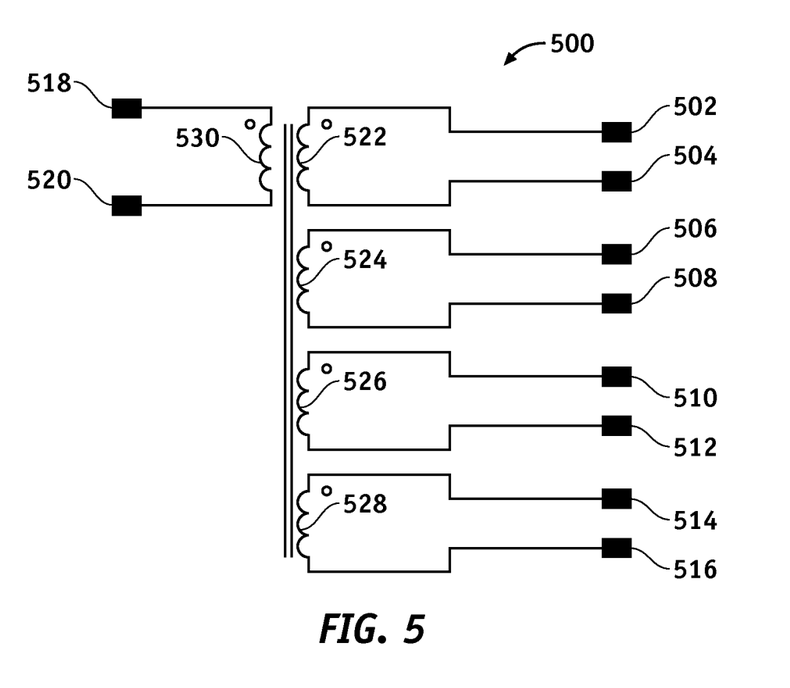
FIG. 5 is an illustration of a circuit diagram of an exemplary gate drive transformer according to an embodiment of the disclosure.

FIG. 5 is an illustration of a circuit diagram of an exemplary gate drive transformer 500 according to an embodiment of the disclosure. The gate drive transformer 500 is coupled to the cell interface circuits 228-234 via leads 502-516, and coupled to the clock 244 via leads 518 and 520. The clock 244 sends a clock drive signal (e.g., a square wave) into the primary winding 530. The leads 502/504 from the first secondary winding 522 and the leads 510/512 from the third secondary winding 526 are coupled in-phase with the clock 244. Thus, lead 502 is connected to lead 322, lead 504 is connected to lead 324, lead 510 is connected to lead 338, and lead 512 is connected to lead 340. The leads 506/508 from the second secondary winding 524 and the leads 514/516 from the fourth secondary winding 528 are coupled in-inverse-phase with the clock 244. Thus, lead 506 is connected to lead 332, lead 508 is connected to lead 330, lead 514 is connected to lead 348, and lead 516 is connected to lead 346. The gate drive transformer 500 drives a first half 228/232 of the cell interface circuits 228-234 at a first phase of the clock drive signal and drive a second half 230/234 of the cell interface circuits 228-234 at a second phase of the clock drive signal. By alternating activation of the first half 228/232 and the second half 230/234, an adequate balancing current is allowed to flow without dissipating a substantial amount of energy from the battery cells 204-210.

Figure 6:
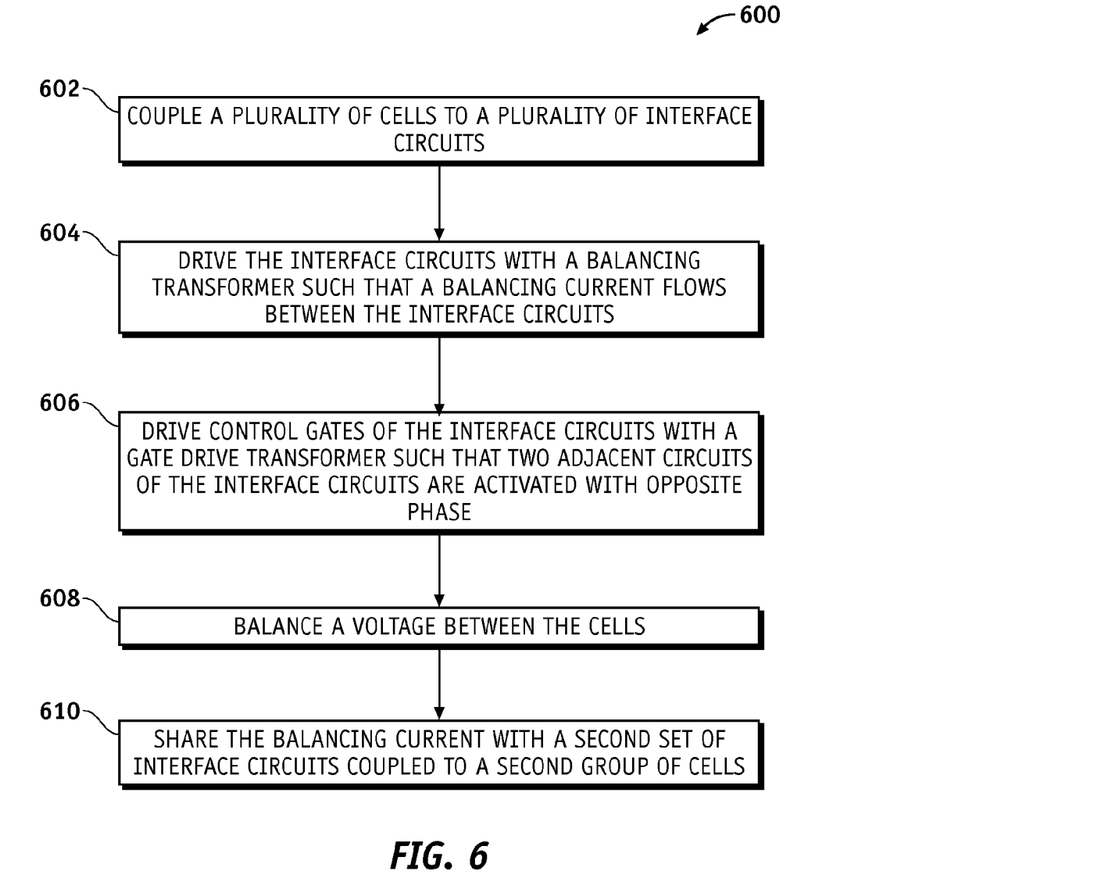
FIG. 6 is an illustration of an exemplary flowchart showing a cell voltage balancing process according to an embodiment of the disclosure.

FIG. 6 is an illustration of an exemplary flowchart showing a cell voltage balancing process 600 according to an embodiment of the disclosure. The various tasks performed in connection with process 600 may be performed mechanically, by software, hardware, firmware, or any combination thereof. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-5. In practical embodiments, portions of the process 600 may be performed by different elements of the system 200 such as: the battery cell interface circuits 228-234, the balancing transformer 238, and the gate drive transformer 242. Process 600 may have functions, material, and structures that are similar to the embodiments shown in FIGS. 1-5. Therefore common features, functions, and elements may not be redundantly described here.

Process 600 may begin by coupling a plurality of cells V1-V12 to the cell interface circuits 228-234 (task 602).

Process 600 may continue by driving the cell interface circuits 228-234 with the balancing transformer 238 such that a balancing current flows between the interface circuits 228-234 (task 604).

Process 600 may continue by driving the cell interface circuits 228-234 with the gate drive transformer 242 such that two adjacent circuits of the cell interface circuits 228-234 are activated with opposite phase (task 606).

Process 600 may continue by balancing a voltage between the cells V1-V12 (task 608).

Process 600 may continue by sharing the balancing current with a second set of interface circuits coupled to a second group of cells (task 610).

In this way, a cell voltage across a series of cells is balanced.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A cell voltage balancing converter system operable to couple to a series of cells, the system comprising:
   a group of cell interface circuits comprising:
      a first cell interface circuit operable to couple to a first cell in the series of cells, and comprising a first balancing bus port operable to couple to a first balancing bus;
      an even number of inner cell interface circuits operable to couple to the even number of cells in the series of cells; and
      a last cell interface circuit operable to couple to a last cell in the series of cells, and comprising a second balancing bus port operable to couple to a second balancing bus; and
   a balancing transformer coupled to a third balancing bus port and a fourth balancing bus port, and operable to balance voltage across the series of cells.

2. The cell voltage balancing converter system according to claim 1, further comprising a gate drive transformer coupled to the cell interface circuits, and operable to receive a clock drive signal and drive a first half of the cell interface circuits at a first phase of the clock drive signal and drive a second half of the cell interface circuits at a second phase of the clock drive signal.

3. The cell voltage balancing converter system according to claim 2, wherein the clock drive signal comprises a bi-phase clock signal.

4. The cell voltage balancing converter system according to claim 1, wherein the even number comprises zero.

5. The cell voltage balancing converter system according to claim 1, further comprising at least one cell coupled to the cell interface circuits.

6. The system according to claim 1, wherein an instantaneous voltage is substantially the same on all windings of the balancing transformer allowing current flow from high voltage cells to low voltage cells.

7. The system according to claim 1, wherein balancing between the first half and the second half of the cells occurs due to an average voltage across the balancing transformer that is substantially the same during a $1^{st}$ half of a clock cycle of a clock as a $2^{nd}$ half of the clock cycle.

8. The system according to claim 1, wherein the cells comprise at least one of the group consisting of: lithium battery cells, lithium-ion battery cells, lithium-polymer battery cells, lithium-sulfur battery cells, and fuel cells.

9. A cell voltage balancing converter system comprising:
   a plurality of cell voltage balancing converter modules each operable to control an even number of cells and comprising:
      a group of cell interface circuits comprising:
         a first cell interface circuit operable to couple to a first cell in a series of cells, and comprising a first balancing bus port operable to couple to a first balancing bus;
         an even number of inner cell interface circuits operable to couple to the even number of cells in the series of cells; and
         a last cell interface circuit comprising a last interface to a last cell in the series of cells, and comprising a second balancing bus port operable to couple to a second balancing bus;
      a balancing transformer coupled to a third balancing bus port and a fourth balancing bus port, and operable to balance voltage across the series of cells;
      a gate drive transformer coupled to the cell interface circuits, and operable to receive a clock drive signal and drive a first half of the cell interface circuits at a first phase of the clock drive signal and drive a second half of the cell interface circuits at a second phase of the clock drive signal; and
   at least one balancing bus coupled between at least two of the cell voltage balancing converter modules.

10. The cell voltage balancing converter system according to claim 9, further comprising at least one cell in a series of cells, wherein the cell is coupled to the cell interface circuits.

11. The cell voltage balancing converter system according to claim 9, wherein the clock drive signal comprises a bi-phase clock signal.

12. A method for cell voltage balancing, the method comprising:
   coupling a plurality of cells to a plurality of interface circuits;
   driving the interface circuits with a balancing transformer such that a balancing current flows between the interface circuits; and
   driving control gates of the interface circuits with a gate drive transformer such that two adjacent circuits of the interface circuits are activated with opposite phase.

13. The method according to claim 12, further comprising balancing a voltage between cells.

14. The method according to claim 13, wherein balancing the voltage comprises balancing a voltage of a first subset of the cells and a second subset of the cells by action of the balancing transformer.

15. The method according to claim 14, wherein balancing between the first subset and the second subset occurs due to an average voltage across the balancing transformer that is substantially the same during a $1^{st}$ half of a clock cycle of a clock as a $2^{nd}$ half of the clock cycle.

16. The method according to claim 12, further comprising sharing the balancing current with a second set of interface circuits coupled to a second group of cells.

17. The method according to claim 16, further comprising balancing a voltage of the cells and the second group of cells.

18. A method for cell voltage balancing, the method comprising:
   coupling a plurality of cells to a plurality of interface circuits;
   driving the interface circuits with a balancing transformer such that a balancing current flows between the interface circuits;
   driving control gates of the interface circuits with a gate drive transformer such that two adjacent circuits of the interface circuits are activated with opposite phase;
   sharing the balancing current with a second set of interface circuits coupled to a second group of cells; and
   balancing a voltage of the cells and the second group of cells, wherein balancing the voltage comprises balancing a voltage of a first subset and a voltage of a second subset by action of the balancing transformer, wherein the first subset comprises a subset of the cells and the second group of cells, and the second subset comprises a subset of the cells and the second group of cells.

19. The method according to claim 18, wherein balancing between the first subset and the second subset occurs due to an average voltage across the balancing transformer that is substantially the same during a $1^{st}$ half of a clock cycle of a clock as a $2^{nd}$ half of the clock cycle.

20. A method for cell voltage balancing, the method comprising:
- coupling a plurality of cells to a plurality of interface circuits;
- driving the interface circuits with a balancing transformer such that a balancing current flows between the interface circuits;
- driving control gates of the interface circuits with a gate drive transformer such that two adjacent circuits of the interface circuits are activated with opposite phase; and
- balancing a voltage between the cells, wherein balancing the voltage comprises balancing a voltage of a first subset of the cells and a second subset of the cells by action of the balancing transformer, and wherein balancing between the first subset and the second subset occurs due to an average voltage across the balancing transformer that is substantially the same during a $1^{st}$ half of a clock cycle of a clock as a $2^{nd}$ half of the clock cycle.

* * * * *